US008160730B2

(12) United States Patent
Lou (10) Patent No.: US 8,160,730 B2
(45) Date of Patent: Apr. 17, 2012

(54) FUZZY LOGIC CONTROL AND OPTIMIZATION SYSTEM

(76) Inventor: Xinsheng Lou, West Hartford, CT (US)

( * ) Notice: Subject to any disclaimer, the term of this patent is extended or adjusted under 35 U.S.C. 154(b) by 71 days.

(21) Appl. No.: 12/394,200

(22) Filed: Feb. 27, 2009

(65) Prior Publication Data

US 2009/0222110 A1 Sep. 3, 2009

Related U.S. Application Data (60) Provisional application No. 61/033,185, filed on Mar. 3, 2008, provisional application No. 61/033,202, filed on Mar. 3, 2008, provisional application No. 61/033,210, filed on Mar. 3, 2008.

(51) Int. Cl.
*G05B 13/02* (2006.01)
*G06F 15/18* (2006.01)
*G01N 31/00* (2006.01)

(52) U.S. Cl. .................. 700/50; 706/4; 702/22
(58) Field of Classification Search ............... 700/50; 706/4; 702/22
See application file for complete search history.

(56) References Cited

U.S. PATENT DOCUMENTS

| | | | |
|---|---|---|---|
| 5,762,008 A | 6/1998 | Martin et al. | |
| 5,806,052 A | 9/1998 | Bonissone et al. | |
| 6,222,164 B1 | 4/2001 | Stoddard et al. | |
| 7,083,658 B2 | 8/2006 | Andrus, Jr. et al. | |
| 7,133,784 B2 * | 11/2006 | Vaidyanathan et al. | 702/30 |
| 7,533,620 B2 | 5/2009 | Morin | |
| 2005/0075993 A1 | 4/2005 | Jang et al. | |
| 2006/0100721 A1 | 5/2006 | Piche | |
| 2007/0250215 A1 | 10/2007 | Jia et al. | |

FOREIGN PATENT DOCUMENTS

| | | |
|---|---|---|
| GB | 2350695 | 12/2000 |
| GB | 2440674 | 2/2008 |

OTHER PUBLICATIONS

PCT International Search Report and The Written Opinion of the International Searcing Authority dated Feb. 5, 2010—(PCT/US2009/035664).
U.S. Appl. No. 12/394,509, filed Feb. 27, 2009.
U.S. Appl. No. 12/394,654, filed Feb. 27, 2009.
PCT International Search Report and The Written Opinion of the International Searching Authority dated Mar. 8, 2009—(PCT/US2009/035674).
PCT International Search Report and The Written Opinion of the International Searching Authority dated Aug. 7, 2009—(PCT/US2009/035672).

(Continued)

*Primary Examiner* — Lore Jarrett
(74) *Attorney, Agent, or Firm* — Robert D. Crawford (57) ABSTRACT

A control system (300) for optimizing a power plant includes a chemical loop having an input for receiving an input signal (369) and an output for outputting an output signal (367), and a hierarchical fuzzy control system (400) operably connected to the chemical loop. The hierarchical fuzzy control system (400) includes a plurality of fuzzy controllers (330). The hierarchical fuzzy control system (400) receives the output signal (367), optimizes the input signal (369) based on the received output signal (367), and outputs an optimized input signal (369) to the input of the chemical loop to control a process of the chemical loop in an optimized manner.

17 Claims, 5 Drawing Sheets

OTHER PUBLICATIONS

S. Maley, R. Romanosky; "Plant Process Control Workshop" U.S. Department of Energy, National Energy Technology Laboratory, Mar. 22, 2006 XP-002532105; p. 18-25, p. 51-52.

A.G. Abilov, Z. Zeybek, O. Tuzunalp, Z. Telatar: "Fuzzy Temerature Contol of Industrial Refineries Furnaces Through Combined Feedforward/Feedback Multivariable Cascade Systems" Chemical Engineering and Processing 41, Jan. 5, 2001, XP002532106 the whole document.

Tiejun Zhang et al: "Terminal Cost Constraint based Stable Fuzzy Model Predictive Control of A Nonlinear Fluidized Bed Combustion Plant" Intelligent Control, 2007. ISIC 2007. IEEE 22$^{nd}$ International Symposium on, IEEE, PI, Oct. 1, 2007, pp. 401-406, XP301230209, ISBN: 978-1-4244-0440-7 abstract p. 401.

Susan M. Maley and Robert R. Romanosky; "Stakeholder Workshop. Advanced Process Control for Next Generation Power Plants. Summary Report" Internet Citation, [Online] Jul. 1, 2007, p. 78pp, XP009121863.

Xinsheng Lou et al.: "Simulation and Advanced Controls for Hybrid Combustion-Gasification Chemical Looping Process" 18$^{th}$ Annual Joint ISA POWID/EPRI Controls and 51$^{st}$ ISA POWID Symposia 2008; Jun. 8-13, 2008, Scottsdale, Arizona, USA,, vol. 475, Jun. 8, 2008, pp. 326-337, XP009118467, ISBN: 978-1-60560-410-7.

\* cited by examiner

FUZZY LOGIC CONTROL AND OPTIMIZATION SYSTEM

CROSS-REFERENCE TO RELATED APPLICATIONS

The present invention claims the benefit of co-pending U.S. Provisional Patent Application Ser. No. 61/033,202, entitled "CONTROL AND OPTIMIZATION SYSTEM", co-pending U.S. Provisional Patent Application 61/033,210, entitled "FUZZY LOGIC CONTROL AND OPTIMIZATION SYSTEM", and co-pending U.S. Provisional Patent Application Ser. No. 61/033,185, entitled "INTEGRATED CONTROLS DESIGN OPTIMIZATION", all of which are incorporated herein by.

STATEMENT REGARDING FEDERALLY SPONSORED RESEARCH OR DEVELOPMENT

The U.S. Government has rights in this invention pursuant to Contract No. DE-FC26-07NT43095 awarded by the U.S. Department of Energy.

TECHNICAL FIELD

The present disclosure relates generally to a control and optimization system and, more particularly, to a hierarchical fuzzy logic control and optimization system for solids transport in a circulating fluidized bed system or a chemical looping system.

BACKGROUND

Fluidized bed combustion (FBC) is a combustion technology used in power plants, primarily to burn solid fuels. FBC power plants are more flexible than conventional plants in that they can be fired on coal, coal waste or biomass, among other fuels. In general, FBC power plants evolved from efforts to find a combustion process able to control pollutant emissions without external emission controls (such as scrubbers). Although FBC power plants have lower pollutant emissions than conventional combustion plants, ongoing efforts continually strive to reduce pollutant emissions to even lower levels.

Chemical looping (CL) is another combustion technology which can also be utilized in electrical power generation plants which burn fuels such as coal, coal waste, biomass, and other opportunity fuels. The CL process can be implemented in existing or new power plants, and provides promising improvements in terms of reduced plant size, reduced emissions, and increased plant operational efficiency, among other benefits.

A typical CL system utilizes a high temperature process, whereby solids such as calcium- or metal-based compounds, for example, are "looped" between a first reactor, called an oxidizer, and a second reactor, called a reducer. In the oxidizer, oxygen from air injected into the oxidizer is captured by the solids in an oxidation reaction. The captured oxygen is then carried by the oxidized solids to the reducer to be used for combustion and/or gasification of a fuel such as coal, for example. After a reduction reaction in the reducer, the solids, no longer having the captured oxygen, are returned to the oxidizer to be oxidized again, and the cycle repeats.

The CL process is more complicated than processes of other plants such as conventional circulating fluidized bed (CFB) plants, for example. In particular, control of circulating solids in the CL process requires multi-loop interactive flow and inventory controls which are not required in traditional plants. As a result, traditional plant controls applied to the CL process necessarily result in separate control loops for each CL loop. However, using separate control loops for each CL loop is inefficient and does not optimize performance of the CL process, since accurate control requires coordinated control of parameters between individual loops. Interactions between variables for each loop of the CL process have to be taken into account to optimize overall CL process performance. Solids flow between loops, for example, is particularly difficult to regulate, due a large number of nonlinear, interrelated variables associated with the solids flow. More specifically, oscillation coupling between loops of a multiple-loop CL-based plant, for example, disrupts flow and makes solids inventory regulation thereof difficult. Also, crossover flows interact with main, e.g., recirculation, flows of opposite loops, thereby complicating overall regulation of solids transport with each respective loop.

Control and optimization tools which have been developed thus far are focused on controlling and optimizing conventional combustion power plants. As a result, these tools have been focused on solving very specific, localized problems rather than global control and optimization of complex plant operations.

Control systems using conventional process controls based on fuzzy set theory (fuzzy logic) have been developed to help overcome some the problems described above. Fuzzy set theory is based on rule-based decision making which emulates a "rule of thumb" reasoning process similar to that of human thought and decision making. However, conventional fuzzy set theory control systems are limited in the number rules which can be memorized, since an excessive number of rules overburdens the fuzzy logic decision making process, effectively obviating the advantages of using fuzzy logic. Thus, as power plant designs evolve and processes thereof become more complex, such as with CL-based power plants described above and, specifically, with multi-loop CL-based power plants, the number of variables involved increases dramatically. As a result, a number of required rules becomes unacceptable, and conventional fuzzy set theory control systems are thereby unable to optimally or efficiently control certain processes, such as solids transport, for example, of a CL-based power plant.

Accordingly, it is desired to develop a control and optimization system for solids transport, for example, in a CFB system or a CL system which overcomes the shortfalls described above.

SUMMARY

According to the aspects illustrated herein, there is provided a control system for optimizing a power plant. The control system includes a chemical loop having an input for receiving an input signal and an output for outputting an output signal, and a hierarchical fuzzy control system operably connected to the chemical loop. The hierarchical fuzzy control system includes a plurality of fuzzy controllers. The hierarchical fuzzy control system receives the output signal, optimizes the input signal based on the received output signal, and outputs an optimized input signal to the input of the chemical loop to control a process of the chemical loop in an optimized manner.

According to the other aspects illustrated herein, a control system for optimizing a power plant includes a first chemical loop having a first input for receiving a first input signal and a first output for outputting a first output signal, and a hierarchical fuzzy control system operably connected to the first chemical loop and having a plurality of fuzzy controllers. The first chemical loop includes a first reactor having at least a first inlet and a first outlet, a first separator operably connected to the first outlet of the first reactor, and a first seal pot control valve disposed between the first separator and the first inlet of the first reactor. The hierarchical fuzzy control system receives the output signal, optimizes the input signal based on the received output signal, and outputs an optimized input signal to the input of the chemical loop to control a process of the chemical loop in an optimized manner.

According to yet other aspects illustrated herein, a control system for optimizing a power plant includes a first chemical loop having a first input for receiving a first input signal and a first output for outputting a first output signal. The first chemical loop includes a first reactor having at least a first inlet and a second outlet, a first separator operably connected to the first outlet of the first reactor, and a first seal pot control valve disposed between the first separator and the first inlet of the first reactor.

The control system further includes a second chemical loop having a second input for receiving a second input signal and a second output for outputting a second output signal. The second chemical loop includes a second reactor having at least a second inlet and a second outlet, a second separator operably connected to the second outlet of the second reactor, and a second seal pot control valve disposed between the second separator and the second reactor inlet. The control system further includes a first crossover leg in fluid communication with the first seal pot control valve of the first chemical loop and the second reactor inlet of the second chemical loop, a second crossover leg in fluid communication with the second seal pot control valve of the second chemical loop and the first reactor inlet of the first chemical loop, and a hierarchical fuzzy control system.

The hierarchical fuzzy control system includes a global fuzzy controller, a first fuzzy controller operably connected to the global fuzzy controller, a second fuzzy controller operably connected to the global fuzzy controller, a third fuzzy controller operably connected to the global fuzzy controller, and a fourth fuzzy controller operably connected to the global fuzzy controller. The global fuzzy controller controls an operation of the first fuzzy controller, the second fuzzy controller, the third fuzzy controller and the fourth fuzzy controller. At least one of the first fuzzy controller, the second fuzzy controller, the third fuzzy controller and the fourth fuzzy controller receives one of the first output signal and second output signal, optimizes one of the first input signal and second input signal based on the received one of the first output signal and second output signal, and outputs an optimized one of the first input signal and second input signal to one of the first chemical loop and the second chemical loop.

The hierarchical fuzzy control system optimizes at least one of a recirculation solids flow in the first chemical loop, a crossover solids flow from the first chemical loop to the second chemical loop through the first crossover leg, a recirculation solids flow in the second chemical loop, and a crossover solids flow from the second chemical loop to the first chemical loop through the second crossover leg.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Disclosed herein is a hierarchical fuzzy logic control and optimization system. More specifically, the hierarchical fuzzy logic control and optimization system in an exemplary embodiment is utilized in a dual loop chemical looping (CL) system of a CL-based power plant to optimally controlling solids transport therein. However, alternative exemplary embodiments are not limited thereto. For example, the hierarchical fuzzy logic control and optimization system may be utilized in a circulating fluidized bed (CFB) system or, alternatively, may be utilized in single or multiple (e.g., two or more) loop CL systems.

Figure 1:
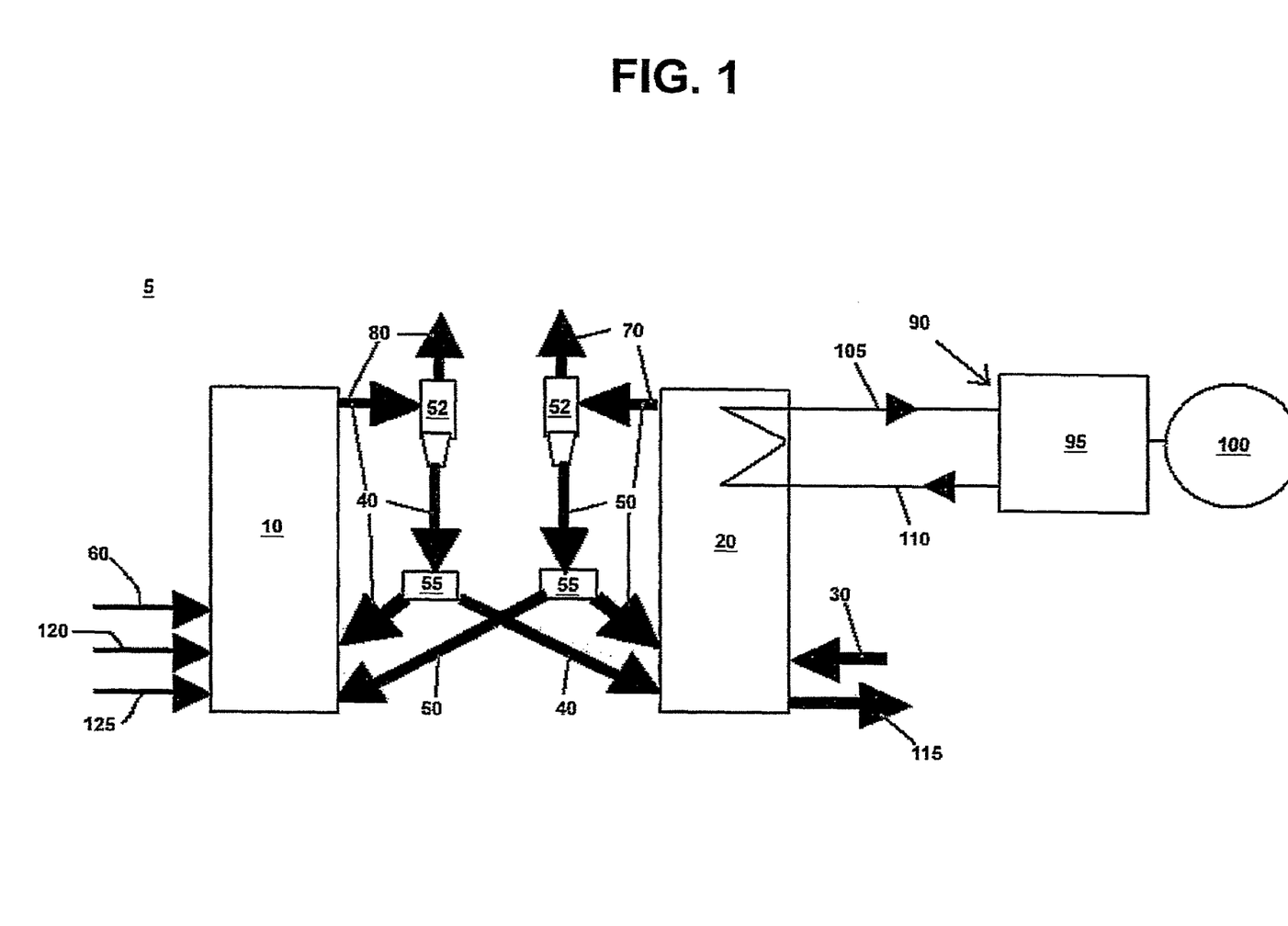
FIG. 1 is a block diagram of a CL combustion-based steam power plant.

Referring to FIG. 1, a CL system 5 shown is similar to that described in U.S. Patent No. 7,083,658, which is incorporated herein by reference. The CL system 5 includes a first reactor 10, e.g., a reducer 10, and a second reactor 20, e.g., an oxidizer 20. Air 30 is supplied to the oxidizer 20, and calcium (Ca) 40, such as limestone, is oxidized therein to produce a calcium oxide (CaO) 50. The CaO 50 is supplied to the reducer 10 via a separator 52 and a seal pot control valve (SPCV) 55, and acts as a carrier to deliver oxygen to fuel 60 (such as coal 60, for example) supplied to the reducer 10. As a result, the oxygen delivered to the reducer 10 interacts with the coal 60 in the reducer 10, and reduced calcium oxide is then returned to the oxidizer 20 to again be oxidized into CaO 50, and the cycle described above repeats.

Oxidation gas 70, such as nitrogen gas ($N_2$) 70, extracted from the air 30 during oxidation, as well as heat (not shown) produced during oxidation, exit the oxidizer 20. Likewise, a gas 80 produced during reduction in the reducer 10 exits the reducer 10. The gas 80 includes, for example, a synthesis gas (syngas) 80, hydrogen gas ($H_2$) 80, and/or carbon dioxide gas ($CO_2$) 80. Composition of the gas 80, e.g., proportions of the syngas 80, the $H_2$ 80, and/or the $CO_2$ 80 therein, varies based upon a ratio of the coal 60 to the air 30.

Exemplary embodiments are not limited to two loops, as described above with reference to FIG. 1, but instead may include either a single loop or more than two loops. For example, in an alternative exemplary embodiment, the CL system 5 includes a third loop (not shown), such as a calciner loop, for example, which allows $H_2$ generation from reformed syngas 80.

The CL system 5 according to an exemplary embodiment further includes a thermal loop 90. The thermal loop 90 includes a steam turbine 95 which drives a power generator 100 using steam 105 generated by boiling feedwater 110 with heat produced during oxidation in the oxidizer 20.

Waste 115, such as ash 115, is removed from the oxidizer 20 for disposal in an external facility (not shown). The coal 60, as well as limestone 120 containing calcium carbonate ($CaCO_3$) and recirculated steam 125, are supplied to the reducer 10 for the reduction reaction therein.

While a calcium oxide based CL system has been described, the present invention is also applicable to a metal oxide based CL system similar to that described in U.S. patent application Ser. No. 10/542,749, which is incorporated herein by reference.

In operation, the reduction reaction occurs between carbon and sulfur in the coal 60, the $CaCO_3$ in the limestone 120, and the CaO 50. The reduction reaction produces the Ca 40, which is separated by the separator 52 and is thereafter supplied to the oxidizer 20 through the SPCV 55. In an exemplary embodiment, the Ca 40 is calcium sulfide (CaS) 40 and the separator 52 is a cyclone separator 52, but alternative exemplary embodiments are not limited thereto. The CaS 40 is then oxidized in an oxidation reaction in the oxidizer 20, thereby producing the CaO 50, which is separated from the oxygen gas 70 (e.g., the $N_2$ 70) by a separator 52 and is supplied back to the reducer 10 via a SPCV 55. The oxidation reaction produces the heat which boils the feedwater 110 into the steam 105 which is supplied to the steam turbine 95.

Figure 2:
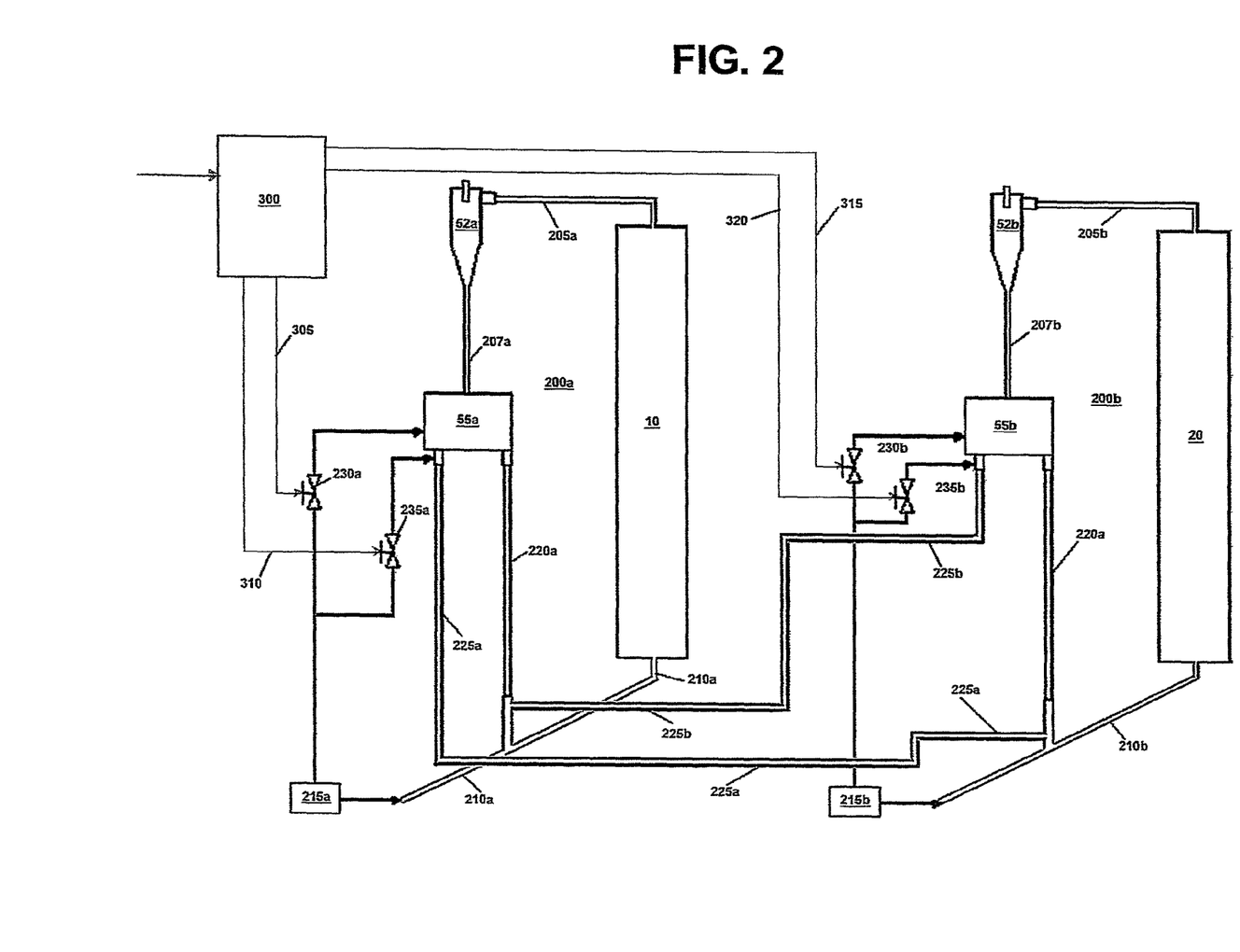
FIG. 2 is a block diagram of two interconnected loops of a CL system.

Hereinafter, the reducer 10, the separator 52 connected to the reducer 10, the SPCV 55 connected thereto, and associated piping connecting the aforementioned items together, e.g., forming a fluidly-connected "loop" therewith, will be referred to as a first loop 200a (FIG. 2). Likewise, the oxidizer 20, the separator 52 connected to the oxidizer 20, the SPCV 55 connected thereto, and associated piping connecting the aforementioned items will be referred to as a second loop 200b (FIG. 2). As will be described in further detail with reference to FIG. 2, a portion of the Ca 40 which exits the reducer 10 through the separator 52 is recirculated back to the reducer 10, e.g., is not sent to the oxidizer 20, by the SPCV 55, based, for example, on a differential pressure between the reducer 10 and the oxidizer 20. Similarly, a portion of the CaO 50 which exits the oxidizer 20 is recirculated back to the oxidizer 20 instead of being sent to the reducer 10. For purposes of discussion herein, transport of solids such as the Ca 40 and the CaO 50 within a given loop, e.g., recirculation, will be referred to as "recirculation solids transport," while transport of solids such as the Ca 40 and the CaO 50 between different loops, e.g., between the first loop 200a and the second loop 200b (FIG. 2), will be referred to as "crossover solids transport." Recirculation solids transport and crossover transport are collectively referred to as "solids transport."

Referring now to FIG. 2, the first loop 200a includes a first reactor 10, a separator 52a, and an SPCV 55a. An upper pipe 205a connects the first reactor 10 to the separator 52a, while a dip leg 207a is connected between the separator 52a and an input of the SPCV 55a. A lower pipe 210a connects an air source 215a to both the first reactor 10 and a return leg 220a. In addition, the return leg 220a is connected between the lower pipe 210a and a first output of the SPCV 55a, as shown in FIG. 2.

Similarly, the second loop 200b includes a second reactor 20, a separator 52b, and an SPCV 55b. An upper pipe 205b connects the second reactor 20 to the separator 52b, while a dip leg 207b is connected between the separator 52b and an input of the SPCV 55b. A lower pipe 210b connects an air source 215b to both the second reactor 10 and a return leg 220b. Further, the return leg 220b is connected between the lower pipe 210b and a first output of the SPCV 55b.

The first loop 200a further includes a crossover leg 225a which connects a second output of the SPCV 55a to the lower pipe 210b of the second loop 200b, while the second loop 200b further includes a crossover leg 225b which connects a second output of the SPCV 55b to the lower pipe 210a of the first loop 200a.

In an alternative exemplary embodiment, the air sources 215a and 215b may be combined, e.g., into a single air source (not shown) which supplies both the first loop 200a and the second loop 200b with air.

During operation of a CL-based power plant, for example, having the first loop 200a and the second loop 200b, solids in the first loop 200a flow upward through the first reactor 10, into the upper pipe 205a, and then into the separator 52a. In the separator 52a, the solids are separated from gas 80 (FIG. 1) and thereafter flow downward into the SPCV 55a via the inlet of the SPCV 55a. Recirculation solids, e.g., a portion of the solids in the SPCV 55a which flow out of the SPCV 55a (through the first outlet thereof) to the return leg 220a to be mixed with air 30 (FIG. 1) from the air source 215a, causes the recirculation solids to be recirculated back to the first reactor 10 (recirculation solids transport).

On the other hand, solids in the SPCV 55a which are not recirculated, e.g., crossover solids, flow out of the SPCV 55a (through the second outlet thereof) and are thus supplied to the lower pipe 210b of the second loop 200b. Crossover solids are thereby delivered to the second reactor 20 (crossover solids transport).

In a similar manner, solids flow in the second loop 200b includes recirculation solids transport within the second loop 200a and crossover solids transport to the first loop 200a.

In an exemplary embodiment, relative proportions of solids in each of the recirculation solids transport and the crossover solids transport of both the first loop 200a and the second loop 200b, e.g., sizes of the portions of solids either recirculated or supplied to another loop, are controlled based upon an amount of air supplied to an associated SPCV 55a or SPCV 55b. More specifically, recirculation air control valves 230a and 230b control recirculation solids transport in the first loop 200a and the second loop 200b, respectively, while crossover air control valves 235a and 235b control crossover solids transport in the first loop 200a and the second loop 200b, respectively. A control system 300 provides control signals to the recirculation air control valves 230a and 230b and the crossover air control valves 235a and 235b.

Specifically, the control system 300 according to an exemplary embodiment provides a first control signal 305 to the recirculation air control valve 230a, a second control signal 310 to the crossover air control valve 235a, a third control signal 315 to the recirculation air control valve 230b, and a fourth control signal 320 to the crossover air control valve 235b, but alternative exemplary embodiments are not limited thereto. For example, the control system 300 may provide control signals (not shown) which control an air flow from the air source 215a and/or the air source 215b, as well as a flow of the fuel 60 (FIG. 1), the limestone 120 (FIG. 1), and/or the recirculation steam 125 (FIG. 1). In additional, control signals of the control system 300 according to alternative exemplary embodiments will be described in further detail below with reference to FIGS. 3 through 5.

Still referring to FIG. 2, the control signals according to an exemplary embodiment will now be described in further detail. The first control signal 305 is based upon a difference between a differential pressure (D/P) across the dip leg 207a and a D/P across the first reactor 10. More specifically, the first control signal 305 adjusts air flow from the air source 215a through the recirculation air control valve 230a to regulate recirculation solids transport in the first loop 200a based upon both the difference between the D/P across the dip leg 207a and the D/P across the first reactor 10 and fuzzy logic rules (described in greater detail below).

The second control signal 310 according to an exemplary embodiment is based upon a difference between a D/P across the crossover leg 225a and a D/P between the lower pipe 210a and the lower pipe 210b. More specifically, the second control signal 310 adjusts air flow from the air source 215a through the crossover air control valve 235a to regulate crossover solids transport from the first loop 200a to the second loop 200b based upon both the difference between the D/P across the crossover leg 225a and the D/P between the lower pipe 210a and the lower pipe 210b, as well as fuzzy logic rules.

The third control signal 315 is based upon a difference between a D/P across the dip leg 207b and a D/P across the second reactor 20. More specifically, the third control signal 315 adjusts air flow from the air source 215b through the recirculation air control valve 230b to regulate recirculation solids transport in the second loop 200b based upon both the difference between the D/P across the dip leg 207b and the D/P across the second reactor 20 and fuzzy logic rules.

The fourth control signal 320 according to an exemplary embodiment is based upon a difference between a D/P across the crossover leg 225b and a D/P between the lower pipe 210b and the lower pipe 210a. More specifically, the fourth control signal 320 adjusts air flow from the air source 215b through the crossover air control valve 235b to regulate crossover solids transport from the second loop 200b to the first loop 200a based upon both the difference between the D/P across the crossover leg 225b and the D/P between the lower pipe 210b and the lower pipe 210a, as well as fuzzy logic rules.

It will be noted that the control signals are not limited to those described herein. For example, control signals according to alternative exemplary embodiments may encompass other controllable parameters, such as temperatures, pressures, flow rates, emissions, and/or heat rates, for example, but not being limited thereto. Furthermore, the control system 300 may be utilized with CL-based plants having more than two loops. As a result, additional control signals will be required based upon the number of loops to be controlled.

A fuzzy controller 330 of the control system 300 according to an exemplary embodiment will now be described in further detail with reference to FIG. 3. As described above in greater detail, fuzzy control is based on fuzzy set theory and is a rule-based decision making process. Further, fuzzy control is a natural extension to conventional proportional-integral-derivative (PID) controls using human heuristic knowledge about plant operations captured in fuzzy rules. In addition, fuzzy rules are used to represent nonlinear mappings between inputs and outputs and fuzzy control thereby offers an alternative to nonlinear model based controllers. Another advantage of fuzzy controllers, particularly when implemented as a neural-fuzzy engine, is that test data can be used to fine tune, e.g., train, rules in the fuzzy controller. Additionally, rules can be added which further support controls optimization and/or process diagnosis.

Figure 3:
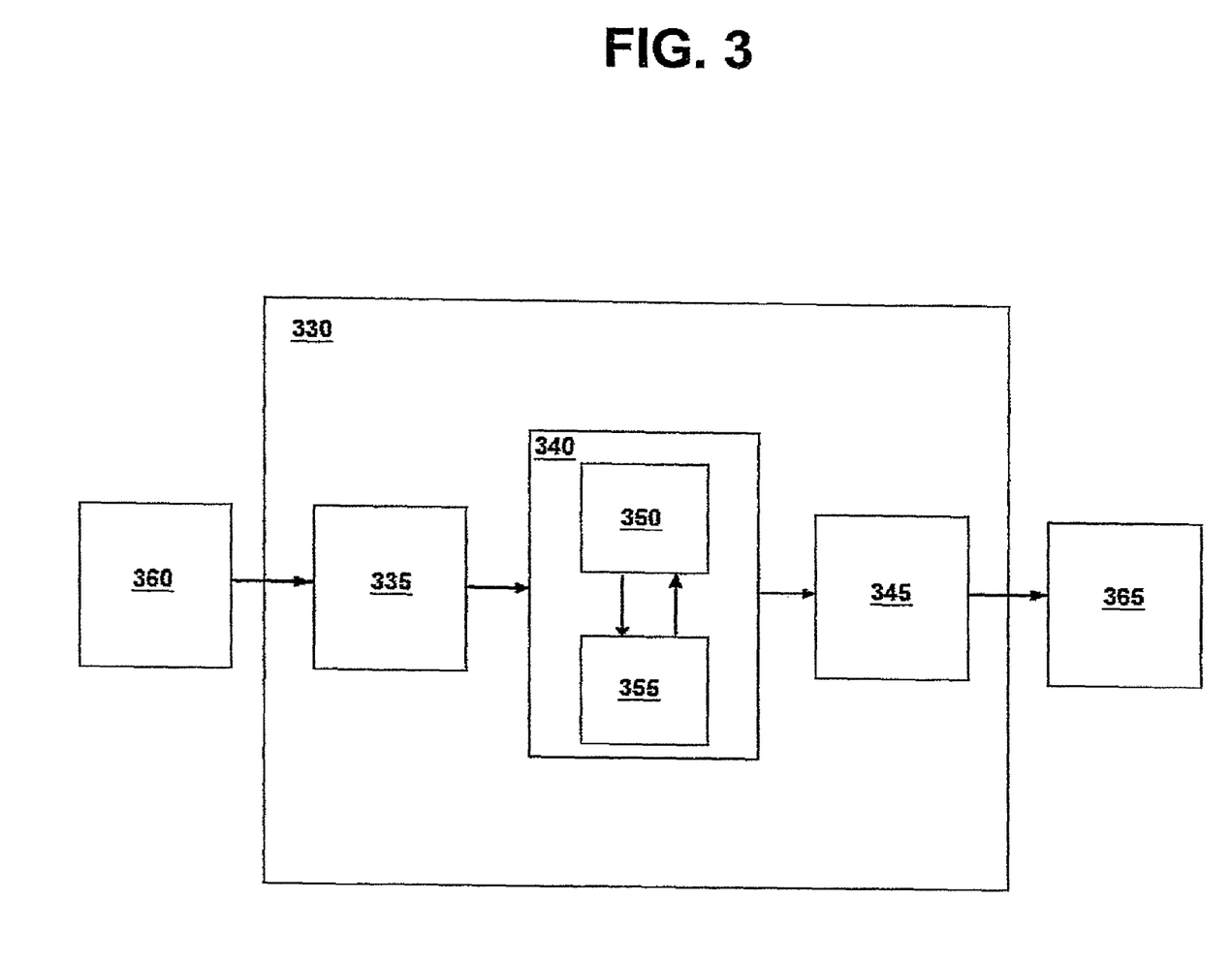
FIG. 3 is a block diagram of single fuzzy logic controller.

Referring to FIG. 3, the fuzzy controller 330 includes a fuzzification part 335, a fuzzy logic decision engine 340 connected to the fuzzification part 335, and a defuzzification part 345 connected to the fuzzy logic decision engine 340. The fuzzy logic decision engine 340 includes a rule base 350 and an inference engine 355 connected to the rule base 350, as shown in FIG. 3. The fuzzy controller 330 receives a preprocessed signal 360 and outputs a processed signal 365. In an exemplary embodiment, the preprocessed signal 360 is an output signal 367 (FIG. 5) from an output of the first loop 200a or the second loop 200b.

In addition, the processed signal 365 according to an exemplary embodiment is a control signal, e.g., an input signal 369 (FIG. 5) supplied to an input of to the first loop 200a or the second loop 200b, such as the first control signal 305, the second control signal 310, the third control signal 315, or the fourth control signal 320 (FIG. 2), for example, but alternative exemplary embodiments are not limited thereto.

The fuzzy controller 330 receives the preprocessed signal 360, and the fuzzification part 335 fuzzifies the preprocessed signal 360, e.g., converts the preprocessed signal 360 into an appropriate format for processing by the fuzzy logic decision engine 340. In an exemplary embodiment, the fuzzy logic decision engine 340 includes a neural-fuzzy engine 340. The fuzzy logic decision engine 340 then uses the inference engine 355 to determine an appropriate parameter, e.g., solution, for the fuzzified preprocessed signal 360 based upon rules (not shown) of the rule base 350. Then, the defuzzification part 345 defuzzifies the preprocessed signal 360 to output the processed signal 365.

Figure 4:
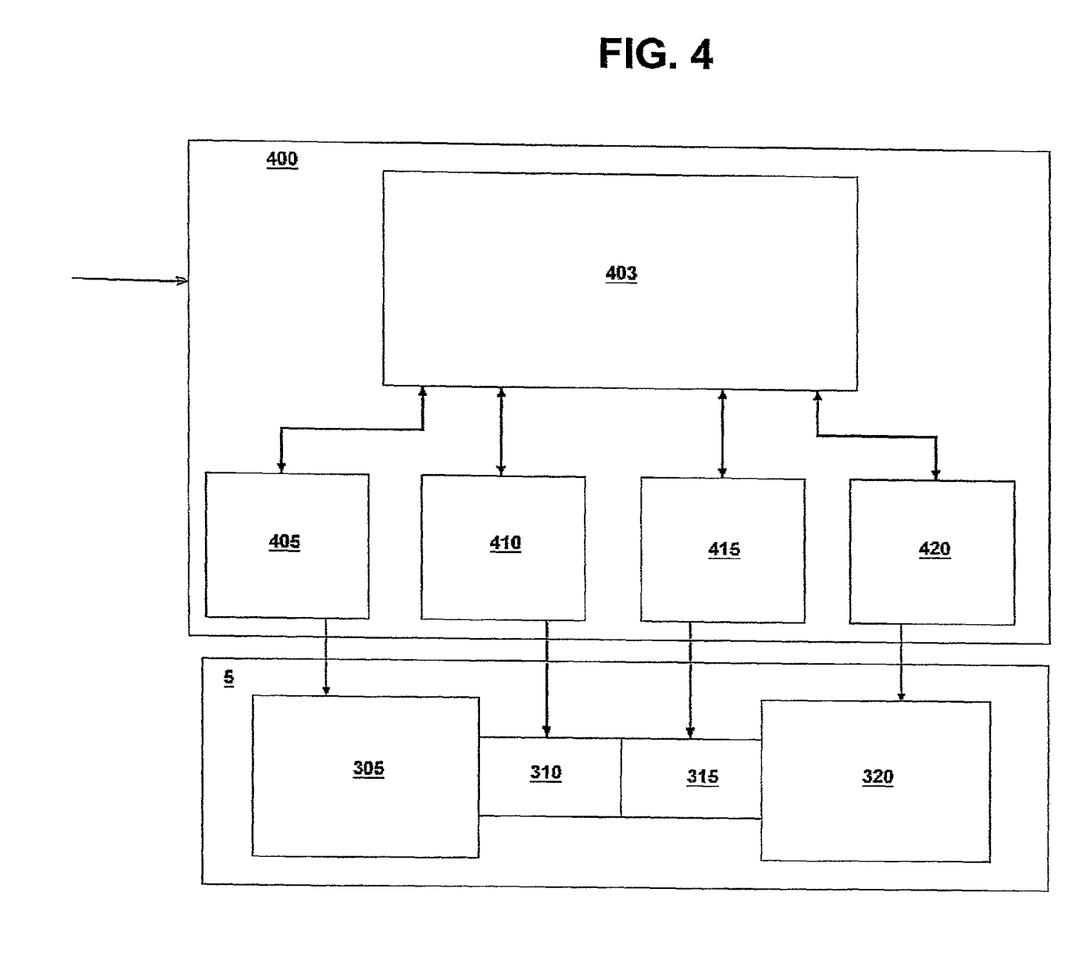
FIG. 4 is block diagram of a hierarchical fuzzy logic control system.

Referring to FIG. 4, a hierarchical fuzzy control system 400 according to an exemplary embodiment includes a plurality of fuzzy controllers such as the fuzzy controller 330. In addition, individual fuzzy controllers of the plurality of fuzzy controllers are arranged in a hierarchical manner. Specifically, a global fuzzy controller 403 operates in a supervisory manner, coordinating overall control of the hierarchical fuzzy control system and, more specifically, control over local fuzzy controllers such as a first fuzzy controller 405, a second fuzzy controller 410, a third fuzzy controller 415, and a fourth fuzzy controller 420, as shown in FIG. 4. Alternative exemplary embodiments, however, are neither restricted nor limited to local fuzzy controllers. For example, the global fuzzy controller 403 may supervise any one type of, or all of, local fuzzy controllers, local PID controllers, local neuro-adaptive controllers, and/or local model-based controllers, for example. In addition, the hierarchical fuzzy control system 400, or a portion thereof, may, in an alternative exemplary embodiment, be integrated into a plant system optimization system, for example.

In an exemplary embodiment, the hierarchical fuzzy control system 400 is implemented as the control system 300, described in greater detail above with reference to FIG. 2, in a CL-based power plant having, for example the first loop 200a and the second loop 200b (FIG. 2). Thus, the global fuzzy controller 403 according to an exemplary embodiment coordinates and supervises the local fuzzy controllers. Further, the local fuzzy controllers individually process signals. More specifically, the first fuzzy controller 405 provides the first control signal 305, the second fuzzy controller 410 provides the second control signal 310, the third fuzzy controller 415 provides the third control signal 315, and the fourth fuzzy controller 420 provides the fourth control signal 320, as shown in FIG. 4.

As a result of using the hierarchical structure shown in FIG. 4, a size of a rule base 350 (FIG. 3) of a given fuzzy controller 300, e.g., the rule base 350 of each of the global fuzzy controller 403, the first fuzzy controller 405, the second fuzzy controller 410, the third fuzzy controller 415, and the fourth fuzzy controller 420, is substantially reduced and/or or effectively minimized, thereby providing an advantage of optimized control over the complex, multivariable, nonlinear and interrelated processes, described above in greater detail, associated with a CL-based power plant. It will be noted that exemplary embodiments described herein can be implemented in any and all CL-based power plants, including but not limited to: single, dual, and multiple, e.g., two or more, loop CL systems, whether calcium- or metal oxide-based; CL-based plant with CO2 capture for utilization or sequestration; and CL-based CO2-ready power plants, but is not limited thereto.

Figure 5:
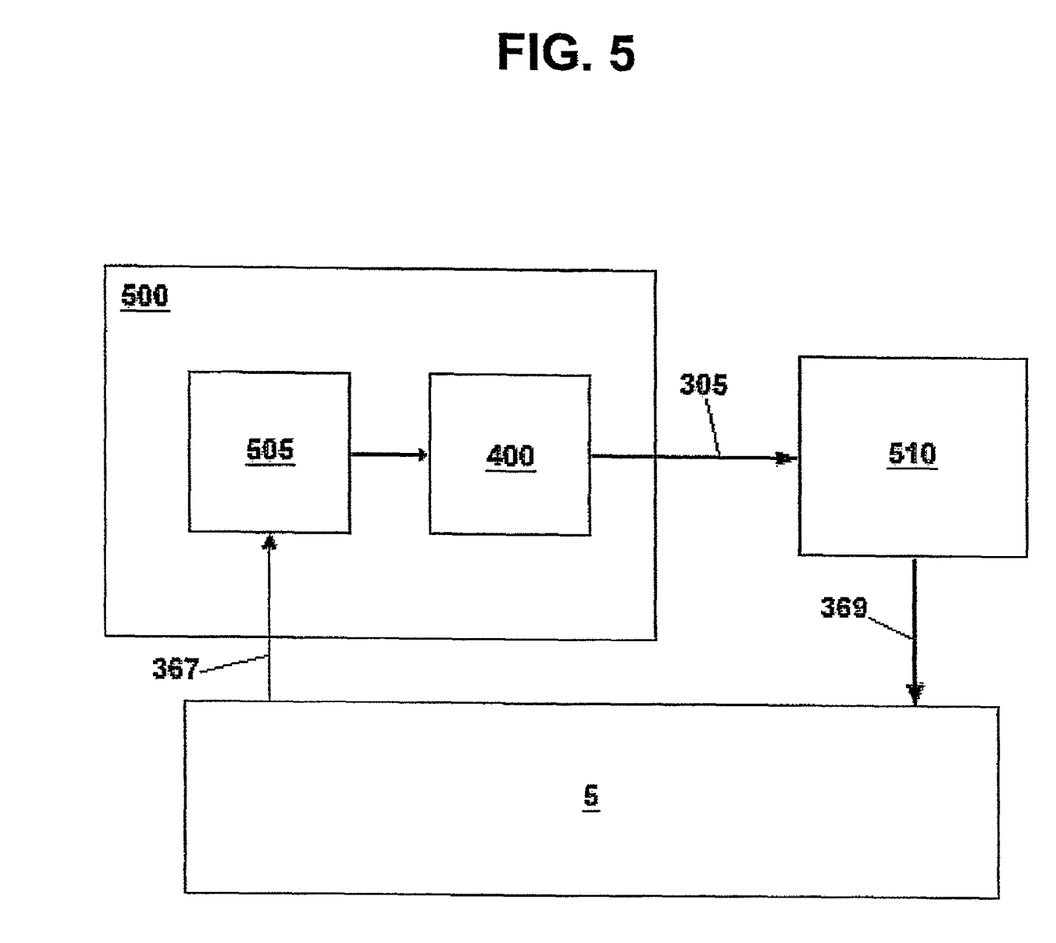
FIG. 5 is a block diagram which shows a hierarchical fuzzy logic control system utilized with a CL system.

Referring now to FIG. 5., implementation of the hierarchical fuzzy control system 400 in the CL system 5 will be described in further detail. The output signal 367 from the output of the first loop 200a or the output of second loop 200b (FIG. 2) of the CL system 5 is supplied to a loop control part 500 having the hierarchical fuzzy control system 400 connected to a data acquisition system (DAS) 505 therein. In an exemplary embodiment, the DAS 505 is an automatic DAS 505 which monitors plant parameters such as temperature, pressure, differential pressure, heat rate, air flow, fuel flow, for example, but not being limited thereto. In addition, in an exemplary embodiment, the loop control part includes a software platform (such as MATLAB® or LABVIEW®, for example) which monitors and facilitates communications between the hierarchical fuzzy control system 400 and the DAS 500.

In operation, the loop control part 500 receives the output signal 367 from the CL system 5. In an exemplary embodiment, the output signal 367 includes, for example, a differential pressure (or a plurality of differential pressures) from the first loop 200a and/or the second loop 200b, as described above in greater detail with reference to FIG. 2. The loop control part 500 outputs a loop control signal based on plant conditions (according to the DAS 505) and fuzzy logic analyses (according to the hierarchical fuzzy control system 400). In an exemplary embodiment, the loop control signal includes, but is not limited to, the first control signal 305, the second control signal 310, the third control signal 315, and/or the fourth control signal 320 (note that for purposes of illustration, only the first control signal 305 is shown in FIG. 5). The loop control signal, e.g., the first control signal 305 shown in FIG. 5, is then supplied to a mass flow controller 510. The mass flow controller 510 then supplies the input signal 369 to the CL system 5, to optimally control the CL system 5 by, e.g., adjusting a valve position such as a position of the recirculation air control valve 230a (FIG. 2) to control a flow of air therethrough, as described above in greater detail. The loop control part 500 may also provide control signals 305 for actuating or generally controlling the operation of a pump, valve, actuator and/or a switch for controlling the operation of the system 5.

The mass flow controller 510 according to an exemplary embodiment includes a valve actuator 510. In addition, the input signal 369 includes, but is not limited to, valve position, fuel flow rate, air flow rate, water flow rate, sorbent flow rate, limestone flow rate, steam flow rate, and a ratio of at least two of fuel flow, air flow rate, limestone flow rate and steam flow rate. Furthermore, the output signal 367 includes signals indicative of operational parameters of the CL system 5, such as power generation rate, load demand, solids inventory, solids transport rate, recirculation solids transport rate, crossover solids transport rate, reactor temperature, loop temperature, bed temperature, heat rate, pressure, differential pressure, reactor pressure, reactor differential pressure, riser differential pressure, seal differential pressure, dip leg differential pressure, crossover leg differential pressure, $CO_2$ flow, $CO_2$ utilization, $CO_2$ capture, $CO_2$ storage, $CO_2$ sequestration, $H_2$ flow rate, $N_2$ flow rate, and synthesis gas flow rate, but alternative exemplary embodiments are not limited thereto.

In an alternative exemplary embodiment, the control system 300 may be utilized with a CFB plant or a CL-plant subsystem having a single loop, e.g., only the first loop 200a shown in FIG. 2. In this case, there is no crossover solids transport. However, it is still desirable to maximize solids flow rate in the first reactor 10 while minimizing a cumulative pressure drop, e.g., differential pressure, across the dip leg 207a, the SPCV 55a, and the return leg 220a. As a result, the control system 300, when used with a CFB plant or a CL-plant subsystem having a single loop, effectively maintains a pressure balance between a riser side of the single loop 200a, e.g., the first reactor 10, and a seal side of the single loop 200a, e.g., the dip leg 207a, the SPCV 55a, and the return leg 220a. Thus, in an exemplary embodiment having only the single loop 200a, a single control signal based upon a pressure difference between the riser side and the seal side of the single loop 200a may control a single control valve regulating an air flow to the SPCV 55a, for example.

In summary, a fuzzy logic control and optimization system according to an exemplary embodiment includes a hierarchical structure. As a result, sizes of rule bases of individual fuzzy controllers included in the fuzzy logic control and optimization system are substantially reduced and/or or effectively minimized, thereby providing an advantage of optimized control over complex, multivariable, nonlinear and interrelated processes associated with a multiple loop CL-based power plant, for example. As a result, plant emissions are substantially reduced and/or effectively minimized, while overall economic plant efficiency is substantially improved, resulting in lower overall operating costs. Further, a hierarchical fuzzy control system (or a part of it) can be integrated into a CL-based plant optimization system, thereby further reducing operating costs.

It will be noted that exemplary embodiments of the fuzzy logic control and optimization system are not limited to the CL plant configurations described herein, or even to CL-based power plants in general. For example, in alternative exemplary embodiments, the fuzzy logic control and optimization system may be used with any and all CL-based systems, including but not limited to: single, dual, and multiple, e.g., two or more, loop CL systems, whether calcium- or metal oxide-based; CL-based plant with $CO_2$ capture for utilization or sequestration; and CL-based $CO_2$-ready power plants, but is not limited thereto. Alternatively, the fuzzy logic control and optimization system may be implemented with any and all fluidized bed combustion (FBC) power plants, including circulating fluidized bed (CFB) boilers, bubbling fluidized bed (BFB) boilers, and variations thereof.

Furthermore, empirical modeling methods such as neural networks (NN), for example, may be implemented in conjunction with (or implemented within) the fuzzy logic control and optimization system described herein.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for controlling a solids transport system comprising:
   a monitoring system in communication with the solids transport system to provide an output signal indicative of the operation of the solids transport system, the control system comprising:
   a hierarchical fuzzy control system operably connected to the solid transport system and comprising a plurality of fuzzy controllers, the hierarchical fuzzy control system comprising a global fuzzy controller operably connected to each of the plurality of fuzzy controllers and controlling an operation of each of the plurality of fuzzy controllers; and
   a flow control device in communication with the solids transport system; wherein the hierarchical fuzzy control system receives the output signal of the solids transport system, determines an input signal based on the received output signal to optimize the operation of the solids transport system, and outputs the input signal to the flow control device of the solids transport system to control at least one of an input parameter or output parameter of the operation of the solids transport system.

2. The control system of claim 1, wherein the solids transport system comprises one of a calcium-based chemical loop and a metal oxide-based chemical loop.

3. The control system of claim 2, wherein the solids transport system comprises one of a single loop solids transport loop system, a multiple loop solid transport loop system, a single loop chemical loop system, a multiple loop chemical loop system, a chemical looping-based plant with $CO_2$ capture for utilization or sequestration, and a chemical looping-based $CO_2$-ready plant.

4. The control system of claim 1, wherein
the input parameter comprises at least one of valve position, fuel flow, air flow, water flow, sorbent flow, limestone flow, steam flow and a ratio of at least two of the fuel flow, the air flow, the limestone flow and the steam flow, and
the output parameter comprises at least one of power generation rate, load demand, solids inventory, solids transport, recirculation solids transport, crossover solids transport, reactor temperature, loop temperature, bed temperature, heat rate, pressure, differential pressure, reactor pressure, reactor differential pressure, riser differential pressure, seal differential pressure, dip leg differential pressure, crossover leg differential pressure, $CO_2$ flow, $CO_2$ utilization, $CO_2$ capture, $CO_2$ storage, $CO_2$ sequestration, $H_2$ flow, $N_2$ flow, and synthesis gas flow.

5. The control system of claim 1, wherein the plurality of fuzzy controllers comprises:
a first fuzzy controller operably connected to the global fuzzy controller;
a second fuzzy controller operably connected to the global fuzzy controller;
a third fuzzy controller operably connected to the global fuzzy controller; and
a fourth fuzzy controller operably connected to the global fuzzy controller, wherein
at least one of the first fuzzy controller, the second fuzzy controller, the third fuzzy controller and the fourth fuzzy controller receives the output signal, optimizes the input signal based on the received output signal, and outputs the optimized input signal to the input of the solids transportation system.

6. The control system of claim 5, wherein
the output signal comprises a differential pressure,
the input signal comprises a valve position,
at least one of the first fuzzy controller, the second fuzzy controller, the third fuzzy controller and the fourth fuzzy controller receives the differential pressure, optimizes the valve position based on the received differential pressure, and outputs the optimized valve position to the input of the solids transport system.

7. The control system of claim 6, wherein the hierarchical fuzzy control system optimizes a solids flow of the solids transport system.

8. A solids transport system comprising:
a first solids transport loop having a first input for receiving a first input signal and a first output for outputting a first output signal, the first solids transport loop comprising:
a first reactor having at least a first inlet and a first outlet;
a first separator operably connected to the first outlet of the first reactor; and
a first seal pot control valve disposed between the first separator and the first inlet of the first reactor;
a flow control device in communication with the solids transport system and a control system; and
the control system that controls the first solids transport loop having a monitoring system to provide an output signal indicative of the operation of the solids transport system, the control system comprising:
a hierarchical fuzzy control system operably connected to the first solids transport loop and comprising a plurality of fuzzy controllers, the hierarchical fuzzy control system comprising a global fuzzy controller operably connected to each of the plurality of fuzzy controllers and controlling an operation of each of the plurality of fuzzy controllers;
wherein the hierarchical fuzzy control system receives the output signal of the solids transport system, determines an input signal based on the received output signal to optimize the operation of the solids transport system, and outputs the input signal to the flow control device of the solids transport system to control at least one of a first input parameter or a first output parameter of the operation of the solids transport system.

9. The solids transport system of claim 8, wherein the first solids transport loop comprises one of a calcium-based chemical loop and a metal oxide-based chemical loop.

10. The solids transport system of claim 8, wherein the solids transport system comprises one of a single loop solids transport system, a multiple solids transport loop, a single loop chemical looping plant, a multiple loop chemical looping plant, a chemical looping-based plant with $CO_2$ capture for utilization or sequestration and a chemical looping-based $CO_2$-ready plant.

11. The solids transport system of claim 8, wherein
the first input parameter comprises at least one of valve position, fuel flow, air flow, water flow, sorbent flow, limestone flow, steam flow and a ratio of at least two of the fuel flow, the air flow, the limestone flow and the steam flow, and
the first output parameter comprises at least one of power generation rate, load demand, solids inventory, solids transport, recirculation solids transport, crossover solids transport, reactor temperature, loop temperature, bed temperature, heat rate, pressure, differential pressure, reactor pressure, reactor differential pressure, riser differential pressure, seal differential pressure, dip leg differential pressure, crossover leg differential pressure, $CO_2$ flow, $CO_2$ utilization, $CO_2$ capture, $CO_2$ storage, $CO_2$ sequestration, $H_2$ flow, $N_2$ flow, and synthesis gas flow.

12. The solids transport system of claim 8, wherein the plurality of fuzzy controllers comprises:
a first fuzzy controller operably connected to the global fuzzy controller;
a second fuzzy controller operably connected to the global fuzzy controller;
a third fuzzy controller operably connected to the global fuzzy controller; and
a fourth fuzzy controller operably connected to the global fuzzy controller, wherein
at least one of the first fuzzy controller, the second fuzzy controller, the third fuzzy controller and the fourth fuzzy controller receives the output signal, optimizes the input signal based on the received output signal, and outputs an optimized input signal to the input of a chemical loop.

13. The solids transport system of claim 12, wherein
the output signal comprises a differential pressure, the input signal comprises a valve position, at least one of the first fuzzy controller, the second fuzzy controller, the third fuzzy controller and the fourth fuzzy controller receives the differential pressure, optimizes the valve position based on the received differential pressure, and outputs an optimized valve position to the first input of the solids transport system.

14. The solids transport system of claim 8, further comprising:

a second solids transport loop having a second input for receiving a second input signal and a second output for outputting a second output signal, the second solids transport loop comprising:
  a second reactor having at least a second inlet and a second outlet;
  a second separator operably connected to the second outlet of the second reactor; and
  a second seal pot control valve disposed between the second separator and the second inlet of the second reactor;
a first crossover leg in fluid communication with the first seal pot control valve of the first solids transport loop and the second reactor inlet of the second solids transport loop; and
a second crossover leg in fluid communication with the second seal pot control valve of the second solids transport loop and the first reactor inlet of the first solids transport loop, wherein
the hierarchical fuzzy control system further receives the second output signal, determines the second input signal based on the received second output signal to optimize the operation of the solids transport system, and outputs the second input signal to the flow control device of the solids transport system to control at least one of the input parameters or output parameters of the operation of the solids transport system; and wherein
the hierarchical fuzzy control system optimizes at least one of a recirculation solids flow in a first solids transport loop, a second solids transport loop, a crossover solids flow from the first solid transport loop to the second solid transport loop through the first crossover leg, a recirculation solids flow in the second solids transport loop, and a crossover solids flow from the second solids transport loop to the first solids transport loop through the second crossover leg, the first chemical loop, a crossover solids flow from the first chemical loop to the second chemical loop through the first crossover leg, a recirculation solids flow in the second chemical loop, and a crossover solids flow from the second chemical loop to the first chemical loop through the second crossover leg.

15. The solids transport system of claim 8, wherein
the first output signal comprises a differential pressure, and the first input signal comprises a valve position.

16. A solids transport system comprising:
a first solids transport loop having a first input for receiving a first input signal and a first output for outputting a first output signal, the first solids transport loop comprising:
  a first reactor having at least a first inlet and a first outlet;
  a first separator operably connected to the first outlet of the first reactor; and
  a first seal pot control valve disposed between the first separator and the first inlet of the first reactor;
a second solids transport loop having a second input for receiving a second input signal and a second output for outputting a second output signal, the second solids transport loop comprising:
  a second reactor having at least a second inlet and a second outlet;
  a second separator operably connected to the second outlet of the second reactor; and
  a second seal pot control valve disposed between the second separator and the second reactor inlet;
a first crossover leg in fluid communication with the first seal pot control valve of the first solids transport loop and the second reactor inlet of the second solids transport loop;
a second crossover leg in fluid communication with the second seal pot control valve of the second solids transport loop and the first reactor inlet of the first solids transport loop; and
a hierarchical fuzzy control system comprising:
  a global fuzzy controller;
  a first fuzzy controller operably connected to the global fuzzy controller;
  a second fuzzy controller operably connected to the global fuzzy controller;
  a third fuzzy controller operably connected to the global fuzzy controller; and
  a fourth fuzzy controller operably connected to the global fuzzy controller, wherein
the global fuzzy controller controls an operation of the first fuzzy controller, the second fuzzy controller, the third fuzzy controller and the fourth fuzzy controller,
at least one of the first fuzzy controller, the second fuzzy controller, the third fuzzy controller and the fourth fuzzy controller receives one of the first output signal and second output signal, optimizes one of the first input signal and second input signal based on the received one of the first output signal and second output signal, and outputs an optimized one of the first input signal and second input signal to one of the first solids transport loop and the second solids transport loop, and
the hierarchical fuzzy control system optimizes at least one of a recirculation solids flow in a first solids transport loop, a second solids transport loop, a crossover solids flow from the first solid transport loop to the second solid transport loop through the first crossover leg, a recirculation solids flow in the second solids transport loop, and a crossover solids flow from the second solids transport loop to the first solids transport loop through the second crossover leg, the first chemical loop, a crossover solids flow from the first chemical loop to the second chemical loop through the first crossover leg, a recirculation solids flow in the second chemical loop, and a crossover solids flow from the second chemical loop to the first chemical loop through the second crossover leg.

17. The solids transport system of claim 16, wherein
the solids transport system comprises one of a single loop solids transport loop system, a multiple loop solid transport loop system, a calcium-based single loop chemical looping plant, a calcium-based multiple loop chemical looping plant, a calcium-based chemical-looping based plant with $CO_2$ capture for utilization or sequestration, a calcium-based chemical-looping based $CO_2$-ready plant, a metal oxide-based single loop chemical looping plant, a metal oxide-based multiple loop chemical looping plant, a metal oxide-based chemical-looping based plant with $CO_2$ capture for utilization or sequestration and a metal oxide-based chemical-looping based $CO_2$-ready plant,
an input parameter comprises at least one of valve position, fuel flow, air flow, water flow, sorbent flow, limestone flow, steam flow and a ratio of at least two of the fuel flow, the air flow, the limestone flow and the steam flow, and an output parameter comprises at least one of power generation rate, load demand, solids inventory, solids transport, recirculation solids transport, crossover solids transport, reactor temperature, loop temperature, bed temperature, heat rate, pressure, differential pressure, reactor pressure, reactor differential pressure, riser differential pressure, seal differential pressure, dip leg differential pressure, crossover leg differential pressure, $CO_2$ flow, $CO_2$ utilization, $CO_2$ capture, $CO_2$ storage, $CO_2$ sequestration, $H_2$ flow, $N_2$ flow, and synthesis gas flow.

* * * * *